United States Patent
Dai et al.

(10) Patent No.: US 7,935,779 B2
(45) Date of Patent: May 3, 2011

(54) SYNTHESIS OF POLYIMIDES (PI) FROM POLY-CARBODIIMIDES AND DIANHYDRIDES BY SEQUENTIAL SELF-REPETITIVE REACTION (SSRR)

(75) Inventors: Shenghong A. Dai, Taichung (TW); Jiang-Jen Lin, Taipei (TW); Kuan-Liang Wei, Taoyuan (TW)

(73) Assignee: Great Eastern Resins Industrial Co., Ltd., Taichung (TW)

( * ) Notice: Subject to any disclaimer, the term of this patent is extended or adjusted under 35 U.S.C. 154(b) by 480 days.

(21) Appl. No.: 12/044,309

(22) Filed: Mar. 7, 2008

(65) Prior Publication Data

US 2009/0012242 A1   Jan. 8, 2009

(51) Int. Cl.
*C08G 69/26* (2006.01)
*C08G 69/00* (2006.01)
*C08G 73/10* (2006.01)

(52) U.S. Cl. ........ 528/310; 525/418; 525/419; 525/424; 525/450; 525/453; 525/907; 528/44; 528/48; 528/80; 528/83; 528/288; 528/312; 528/322

(58) Field of Classification Search .................. 525/418, 525/419, 424, 450, 453, 907; 528/44, 48, 528/80, 83, 288, 310, 312, 322
See application file for complete search history.

(56) References Cited

U.S. PATENT DOCUMENTS 5,648,451 A * 7/1997 Sashida et al. ................ 528/353

FOREIGN PATENT DOCUMENTS

JP     6-80776   *   3/1994

* cited by examiner

*Primary Examiner* — Ana L Woodward
(74) *Attorney, Agent, or Firm* — Connolly Bove Lodge & Hutz LLP (57) ABSTRACT

Disclosed are processes for synthesizing polyimides by a sequential self-repetitive reaction between poly (aryl carbodiimide) (p-CDI) or aryl diisocyanates with dianhydrides.

18 Claims, 3 Drawing Sheets

SYNTHESIS OF POLYIMIDES (PI) FROM POLY-CARBODIIMIDES AND DIANHYDRIDES BY SEQUENTIAL SELF-REPETITIVE REACTION (SSRR)

FIELD OF THE INVENTION

The present invention relates to processes for synthesizing polyimides (PI) by a sequential self-repetitive reaction (an "SSRR" reaction or "SSRR" process) between poly-carbodiimides or diisocyanates with dianhydrides.

BACKGROUND OF THE INVENTION

Polyimide (PI) is one of the most widely used high-temperature polymers. PI possesses an excellent thermal property, mechanical property, and flame/chemical resistance and it has been extensively used in the aviation, automotive, aerospace, and electronic industries (see Maier, G., Prog. Polym. Sci. 2001, 26, 3).

A large number of new PIs with unique properties have been introduced for various industrial and consumer product applications since their commercializations at the beginning of the 1960s (see Kharitonov, A. P.; Taege, R.; Ferrier, G.; Teplyakov, V. V.; Syrtsova, D. A.; Koops, G.-H., J. Fluorine Chem. 2005, 126, 251, and Ameduri, B.; Boutevin, B., J. Fluorine Chem. 2005, 126, 221, and Rusanov, A. L.; Komarova, L. G.; Likhatchev, D. Y.; Shevelev, S. A.; Tartakovsky, V. A., Russ. Chem. Rev. 2003, 72, 899).

General synthetic methods of PIs have been well developed, including the step of condensation reaction between diamines and dianhydrides. However, PI, particularly aromatic PI, has encountered numerous processing difficulties due to its poor solubility in organic solvents. As a result, PIs are usually synthesized in-situ by forming soluble poly(amic acid) intermediates from the reaction of diamine and dianhydride at low temperatures during their first-step of syntheses, casting the poly(amic acids) as films, and in the final step, conducting ring-closuring imidization at high temperatures (>300° C.) to remove water and the solvent. In order to improve the solubility and processing capability of PIs, some structural modifications introducing bulky groups or flexible chains such as —O—, —SO$_2$—, —C═O, —CF$_3$, —CH$_3$ into the backbone or side chain of PIs have also been demonstrated. (see Eastmond, G. C., Paprotny J., React. Funct. Polym. 1996, 30, 27).

In this present invention, we uncovered a new synthetic process for PIs using a sequential self-repetitive reaction (SSRR), especially as a one-pot process by bringing together poly(aryl carbodiimides) (p-CDI) from aryl diisocyanates and o-ester acids from dianhydrides. The raw materials for forming PIs are dianhydrides and common diisocyanates can also be used with a CDI catalyst as the sources for p-CDIs through poly-condensation reactions.

SUMMARY OF THE INVENTION

It is therefore an object of the invention to provide a process for synthesizing a polyimide having the formula wherein n is an integer in the range of 1 to 100 and R is an optionally substituted tetravalent aromatic organic radical containing at least one benzene ring or an optionally substituted tetravalent aliphatic organic radical containing at least two carbon atoms, comprising:

a) reacting a dianhydride having the formula with R$_2$—OH (wherein R$_2$ is C$_{1-8}$ alkyl) in a molar ratio of about 1:1 to form an acid-ester functionalized anhydride having the formula b) reacting a poly (aryl carbodiimide) (p-CDI) and said acid-ester functionalized anhydride to form a poly-acylurea-functionalized ester-anhydride (p-AEA) having the formula p-AEA c) reacting said p-AEA with R$_2$—OH (wherein R$_2$ is C$_{1-8}$ alkyl) in a molar ratio of about 1:1 to form a poly-acylurea-functionalized ester-acid-ester (p-AEAE) having the formula p-AEAE d) heating said p-AEAE in the presence of a CDI catalyst to a temperature from about 120° C. to about 280° C. to form an aryl isocyanate and a poly(acid-ester-amide) having the following formula and simultaneously conducting a sequential self-repetitive reaction to form said polyimide, wherein said sequential self-repetitive reaction involves repetitions of three sequential steps comprising:

1) catalytically converting said aryl isocyanate into said p-CDI in the presence of said CDI catalyst;
2) reacting said p-CDI and said poly(acid-ester-amide) to form a poly-acylurea-functionalized amide-ester (p-AAE) having the formula p-AAE

3) thermolyzing said p-AAE obtained in step 2 into said aryl isocyanate and a poly-di(ester-amide) having the formula poly-di(ester-amide)

said poly-di(ester-amide) further being subject to a ring-closure reaction to release $R_2OH$s and form said polyimide as a product.

It is another object of the invention to provide a process for synthesizing a polyimide having the structural formula wherein n is an integer in the range of 1 to 100 and R is an optionally substituted tetravalent aromatic organic radical containing at least one benzene ring or an optionally substituted tetravalent aliphatic organic radical containing at least two carbon atoms, comprising:

a) reacting a dianhydride having the formula with $R_2$—OH (wherein $R_2$ is $C_{1-8}$ alkyl) in a molar ratio of about 1:2 to form a di(ester-acid) having the formula b) heating said di(ester-acid) and a p-CDI to a temperature from about 120° C. to about 280° C. to conduct the sequential self-repetitive reaction as defined above to form said polyimide.

Various advantages and objects of the present invention will be apparent to those skilled in the art from the descriptions below and from the appended claims.

DETAILED DESCRIPTION OF THE INVENTION

At first, the present invention provides a process for synthesizing polyimides by a SSRR reaction.

The process of the present invention starts from reacting a dianhydride having the following formula (wherein R is an optionally substituted tetravalent aromatic organic radical containing at least one benzene ring or an optionally substituted tetravalent aliphatic organic radical containing at least two carbon atoms with $R_2$—OH (wherein $R_2$ is $C_{1-8}$ alkyl), preferably in a molar ratio of about 1:1 to form an acid-ester functionalized anhydride having the formula Examples of suitable aromatic dianhydride include, but not limited to 3,3',4,4'-benzophenone tetracarboxylic acid anhydride, pyromellitic dianhydride, 2,3,6,7-napthalene tetracarboxylic acid dianhydride, 1,4,5,6-tetracarboxylic dianhydride, 3,3',4,4'-diphenyl tetracarboxylic acid dianhydride, 1,2,5,6-napthalene tetracarboxylic acid dianhydride, 2,2',3,3'-diphenyl tetracarboxylic acid dianhydride, 2,2-bis(3,4,-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8,9,10-tetracarboxylic acid dianhydride, bis(3,4-dicarboxyphenyl) sulfone dianhydride, (3',4'-dicarboxyphenyl) 2-dicarboxy 5,6-benzimidazole dianhydride, (3',4'-dicarboxyphenyl) 2-dicarboxy 5,6-benzoxazole dianhydride, (3',4'-dicarboxyphenyl) 2-dicarboxy 5,6-benzothiazole dianhydride, or bis (3',4'-dicarboxydiphenylether) 2,5-oxadiazole 1,3,4 dianhydride.

Examples of suitable aliphatic dianhydride include, but not limited to tetrahydrofuran tetracarboxylic dianhydride, cyclopentane tetracarboxylic dianhydride, bicycle-[2,2,2]-octen-(7)-2,3,5,6-tetracarboxylic-2,3,5,6-dianhydride, 1,2,3, 4-cyclobutanetetracarboxylic acid dianhydride, and 1,2,4,5-cyclobutanetetracarboxylic acid dianhydride.

As known in the art, the anhydride/$R_2$—OH reaction may be conducted in the presence of a catalyst such as triethylamine (TEA).

Subsequently, the obtained acid-ester functionalized anhydride is reacted with a poly(aryl carbodiimide) (p-CDI) to form a poly-acylurea-functionalized ester-anhydride (p-AEA) having the formula p-AEA As well known in the art, the p-CDI used in the present invention can be previously formed by catalytically converting an aryl diisocyanate in the presence of a CDI catalyst. It is preferred that this reaction is carried out in dry N-methylpyrrolidone (NMP). However, other suitable solvents may be used. Suitable solvents include N,N dimethylacetamide (DMAC), tetramethylene sulfone (TMS), N,N dimethylformamide (DMF) and dimethylsulfoxide (DMSO). Those skilled in the art are readily able to determine which solvents are suitable in carrying out this reaction. The species of the CDI catalysts are also well documented and familiar to skilled artisans. Suitable CDI catalyst includes, but not limited to, various organic derivatives of phosphorous and ringed-phosphorous compounds such as 3-methyl-3-phospholene oxide (MPO) 1,3-dimethyl-3-phospholene oxide (DMPO), 1,3-dimethyl-1,3,2-diazaphosphorolidine, triphenyl arsineoxide, and those listed on page 235 of Tetrahedron Report R101 in Tetrahedron Vol. 37, pages 233-284, (1981) and Angew. Chem. Int. Ed. Vol. 1, 621 (1962), which are incorporated herewith for reference.

There is no particular limitation to the species of aryl diisocyanate. In a more general sense, any aryl diisocyanate can be used for carrying out the present invention. According to the present invention, the radical "aryl" refers to a monovalent monocyclic or bicyclic aromatic hydrocarbon moiety which is optionally substituted with one or more, preferably one, two or three, substituents, each of which is preferably selected from the group consisting of $C_{1-8}$ alkyl, $C_{1-8}$ alkoxy, nitro, halo, and aryl $C_{1-8}$alkyl. A particularly preferred aryl substituent is methyl, methoxy, nitro, fluoro, chloro, bromo, oxygen, sulfur, sulfone or phenylmethyl. More specifically the term aryl includes, but is not limited to, phenyl, tolyl or phenylmethylene, and the like.

According to the present invention, suitable aryl diisocyanate includes, but not limited to, 4,4'-diphenylmethane diisocyanate (MDI), 4,4'-biphenylene diisocyanate, 4,41-Diisocyanatodiphenyl sulfide, 4,4'-diisocyanato diphenyl sulfone, 4,4'-diisocyanato diphenyl ether, meta-naphthalene diisocyanate (MNDI), para-naphthalene diisocyanate (PNDI), meta-phenylene diisocyanate (MPDI), para-phenylene diisocyanate (PPDI), tolylene diisocyanate (TDI), 4,4'-diisocyanato-3,3'-dimethyldiphenylenemethane, 4,4'- methylenebis(1-isocyanato-2-methoxybenzene), meta-xylylene diisocyanate, para-xylylene diisocyanate, or a mixture thereof.

According to an embodiment of the present invention, the reaction of acid-ester functionalized anhydride with a p-CDT comprises mixing the acid-ester functionalized anhydride with an aryl diisocyanate, following by catalytically converting the aryl diisocyanate into a p-CDI in the presence of a CDI catalyst, and then reacting the p-CDI and acid-ester functionalized anhydride to the p-AEA.

It is known in the art that aryl N-acylurea is thermally stable up to about 120° C. and undergoes a rapid transformation into isocyanate and amide at a higher temperature. It is also known in the art that isocyanates can be converted to CDIs in the presence of a CDI catalyst.

Accordingly, the obtained p-AEA is firstly reacted with R$_2$—OH (wherein R$_2$ is C$_{1-8}$ alkyl) in a molar ratio of about 1:1 again to is form a poly-acylurea-functionalized ester-acid-ester (p-AEAE) having the formula p-AEAE

The obtained P-AEAE is further heated in the presence of a CDI catalyst to a temperature from about 120° C. to about 280° C., preferably from about 120° C. to about 270° C., more preferably from about 140° C. to about 250° C., to form an aryl isocyanate and a poly(acid-ester-amide) having the following formula while the SSRR reaction involving repetitions of the following three sequential steps is simultaneously conducted to form a polyimide having the formula 1) catalytically converting said aryl isocyanate into said p-CDI in the presence of said CDI catalyst;
2) reacting said p-CDI and said poly(acid-ester-amide) derivative to form a p-AAE having the formula p-AAE

3) thermolyzing said p-AAE obtained in step 2 into said aryl isocyanate and poly-di(ester-amide) having the formula poly-di(ester-amide)

said poly-di(ester-amide) further being subject to a ring-closure reaction to release ROHs and form said polyimide as a product.

As illustrated in Scheme 1, the SSRR process is consisted of three self-repetitive steps. The first step is the catalytic conversion of 1.0 mole of the aryl isocyanate into 0.5 mole of the p-CDI. The second step is the reaction between 0.5 mole of the p-CDI and 0.5 mole of the poly(acid-ester-amide) to form 0.5 mole of the p-AAE. Lastly, the third step is the thermolysis of 0.5 mole of the p-AAE yielding 0.5 mole of the aryl isocyanate and concurrently generating 0.5 mole of the poly-di(ester-amide) which is further subject to a ring-closure reaction to form 0.5 mole of the polyimide as a product. Thus, it points to the fact that 50% of the aryl isocyanate and the poly(acid-ester-amide) were consumed in one full cycle by the SSRR to form 50% of the polyimide. Repetitions of the same three sequential reactions will eventually consume all the aryl isocyanate and the poly(acid-ester-amide).

Scheme 1

In another embodiment of the present invention, the above-mentioned process for synthesizing polyimides by the SSRR can directly start from the ring-opening reaction of dianhydrides as a one-pot process. As stated above, an aryl diisocyanate and a CDI catalyst can replace the p-CDI used to react with the product of the ring-opening reaction of dianhydrides. Accordingly, the above-mentioned process for synthesizing polyimides by the SSRR can directly start from the ring-opening reaction of dianhydrides, followed by mixing with an aryl diisocyanate and a CDI catalyst, as a one-pot process.

It is preferred that all of the starting materials are dissolved in a suitable solvent, such as dry tetrahydrofuran (THF), N-methylpyrrolidone (NMP), tetramethylene sulfone (TMS), N,N dimethylacetamide (DMAC), N,N dimethylformamide (DMF) and dimethylsulfoxide (DMSO), to carry out the SSRR process so as to produce the desired polyimide.

Those skilled in the art are readily able to determine which solvents are suitable in carrying out this reaction.

Specifically in the present invention, the poly(aryl acylurea) is decomposed into the poly-di(ester-amide) and the aryl isocyanate at a temperature of from about 120° C. to about 180° C. Then, the reaction temperature is raised to a range of about 180° C. to about 280° C. for a sufficient time, such as about 15 minutes to about 120 minutes, to affect the ring-closure and form the desired polyimide.

In another embodiment of the present invention, the ring-opening reaction of aryl dianhydride can be completely conducted at first to obtain an aryl di(ester-acid). The obtained aryl di(ester-acid) is then reacted with a p-CDI or mixed with an aryl diisocyanate and a CDI catalyst so as to conduct the above-mentioned SSRR process for synthesizing polyimides.

Accordingly, the present invention further provides a process for synthesizing a polyimide having the structural formula wherein n is an integer in the range of 1 to 100 and R is an optionally substituted tetravalent aromatic organic radical containing at least one benzene ring or an optionally substituted tetravalent aliphatic organic radical containing at least two carbon atoms
comprising:
a) reacting a dianhydride having the formula with $R_2$—OH (wherein $R_2$ is $C_{1-8}$ alkyl) in a molar ratio of about 1:2 to form a di(ester-acid) having the formula b) heating said di(ester-acid) and a p-CDI to a temperature from about 120° C. to about 280° C., preferably from about 120° C. to about 270° C., more preferably from about 140° C. to about 250° C., to conduct the sequential self-repetitive reaction as defined above to form the polyimide.

According to an embodiment of the present invention, the reaction of di(ester-acid) with a p-CDI comprises mixing the di(ester-acid) with an aryl diisocyanate, following by catalytically converting the aryl diisocyanate into a p-CDT in the presence of a CDI catalyst, and then heating the p-CDI and di(ester-acid) to conduct the sequential self-repetitive reaction.

Similarly, the above-mentioned synthesizing process can directly start from the ring-opening reaction of dianhydrides as a one-pot process. Furthermore, the synthesizing process is preferably carried out in a suitable solvent, such as dry tetrahydrofuran (THF), N-methylpyrrolidone (NMP), tetramethylene sulfone (TMS), N,N dimethylacetamide (DMAC), N,N dimethylformamide (DMF) and dimethylsulfoxide (DMSO), so as to produce the desired product. Those skilled in the art are readily able to determine which solvents are suitable for carrying out this reaction. Furthermore, as above-mentioned, the anhydride/$R_2$—OH reaction may be conducted in the presence of a catalyst such as triethylamine (TEA).

Without further elaboration, it is believed that one skilled in the art can, based on the above disclosure and the examples described below, utilize the present invention to its fullest extent. The following examples are to be construed as merely illustrative examples of how one skilled in the art can practice the claimed methods and are not limitative of the remainder of the disclosure in any way.

EXAMPLES

General. $^1$H NMR spectra were recorded on Varian Inova 200 MHz or 600 MHz. Chemical shifts are given in δ, the coupling constants J are given in Hz. The spectra were recorded in solvents such as acetone-d6 or DMSO-d6 at room temperature, and chemical shifts are given relative to the solvent signals.

Example 1

Methanol (50 ml) was placed into a 100 ml, three-necked, round-bottomed flask equipped with a thermometer, a nitrogen gas inlet tube, a reflux condenser, an oil bath, and a magnetic stirrer. Then pyromellitic dianhydride (PMDA, 2 g, 9.17 mmol) was added, and the mixture was heated to 50° C. for 1 h. In the end of reaction, solvent was removed through evaporation under reduced pressure. The product was obtained and yielded 93% of m-dimethyl pyromellitate (PMDE) as a white solid.

Example 2

Methanol (100 ml) was placed into a 250 ml, three-necked, round-bottomed flask equipped with a thermometer, a nitrogen gas inlet tube, a reflux condenser, an oil bath, and a magnetic stirrer. 3,3',4,4'-benzophenone tetracarboxylic dianhydride (BTDA, 9.95 g, 30.1 mmol) was added to methanol, and the mixture was heated to 60° C. for 2 h. In the end of reaction, solvent was removed through evaporation under reduced pressure. The product was obtained and yielded 89% of 1,2-benzenedicarboxylic acid-4,4'-carbonylbis-2,2'-dimethyl ester (BTDE) as a yellow solid.

Example 3

Methanol (50 ml) was placed into a 100 ml, three-necked, round-bottomed flask equipped with a thermometer, a nitrogen gas inlet tube, a reflux condenser, an oil bath, and a magnetic stirrer. 3,3',4,4'-oxydiphthalic dianhydride (ODPA, 5 g, 16.12 mmol) was added to methanol, and the mixture was heated to 60° C. for 2 h. In the end of reaction, solvent was removed through evaporation under reduced pressure. The product was obtained and yielded 92% of 1,2'-benzenedicarboxylic-4,4'-oxybis-2,2'-dimethyl ester (ODPE).

Example 4

NMP (20 ml) was placed into a 100 ml, three-necked, round-bottomed flask equipped with a thermometer, a nitrogen gas inlet tube, a reflux condenser, an oil bath, and a magnetic stirrer. DMPO (20 mg) and PMDE (1 g, 3.5 mmol) formed from Example 1 were added, and the mixture was heated to 10° C. with stirring for 10 minutes. MDI (0.887 g; 3.55 mmol) was added into the mixture. The mixture was heated to 200° C. and stirred for h. The resulting PI (MDI-phenyl-PI) was precipitated from NMP and isolated by filtering (96%). The detailed reactions scheme is as shown below.

Scheme 2

Example 5

NMP (30 ml) was placed into a 100 ml, three-necked, round-bottomed flask equipped with a thermometer, a nitrogen gas inlet tube, a reflux condenser, an oil bath, and a magnetic stirrer. DMPO (20 mg) and BTDE (1.542 g, 3.99 mmol) were added, and the mixture was heated to 180° C. with stirring for 10 minutes. MDI (1 g; 3.99 mmol) was added into the mixture. The mixture was heated to 200° C. and stirred for 5 h. The resulting MDI-ketone-PI was precipitated from NMP and isolated by filtering (98%). The detailed reactions scheme is as shown in Scheme 3.

Example 6

Figure 1:
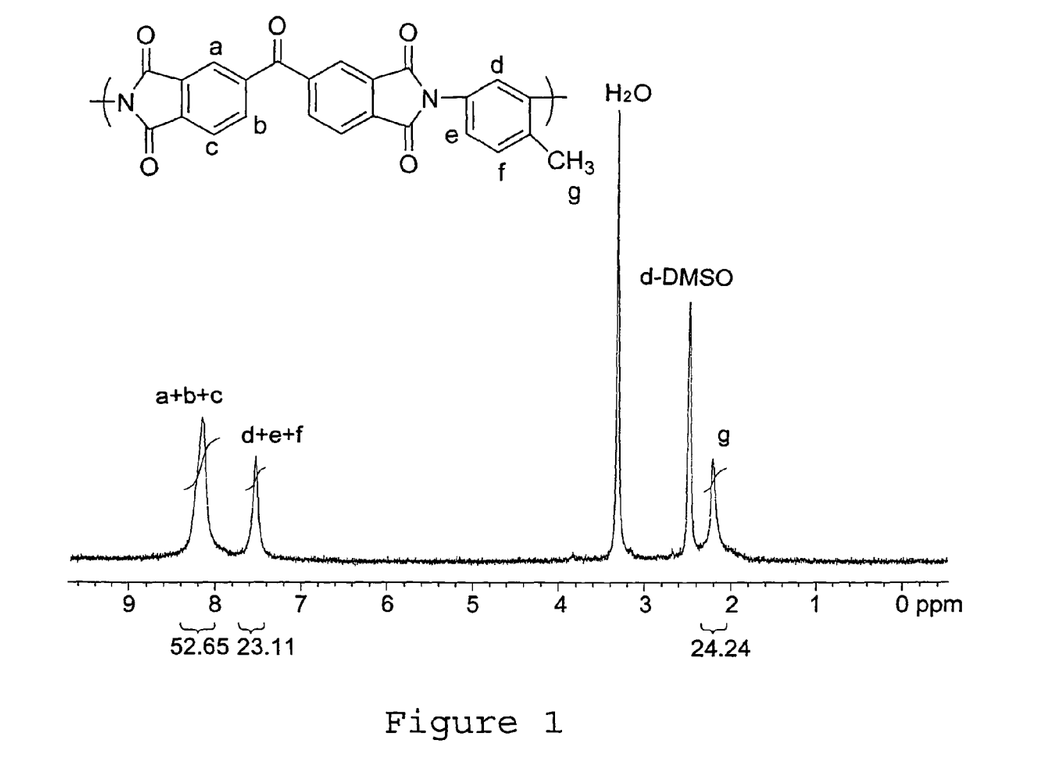
FIGS. 1 to 3 show the $^1$H NMR spectra of polyimides obtained by the process of the present invention, which are illustrated in the examples.

NMP (30 ml) was placed into a 100 ml, three-necked, round-bottomed flask equipped with a thermometer, a nitrogen gas inlet tube, a reflux condenser, an oil bath, and a magnetic stirrer. DMPO (20 mg) and BTDE (1.108 g, 2.87 mmol) were added, and the mixture was heated to 180° C. with stirring for 10 minutes. TDI (0.5 g; 2.87 mmol) was added into the mixture. The mixture was heated to 200° C. and stirred for 5 h. The resulting solution obtained was poured into 500 ml of water. The resulting product was filtered and dried, to yield 1.16 g (99%) of TDI-ketone-PI. The $^1$H NMR analysis of TDI-ketone-PI was shown in FIG. 1. The detailed reactions scheme is as shown in Scheme 3.

Example 7

Figure 2:
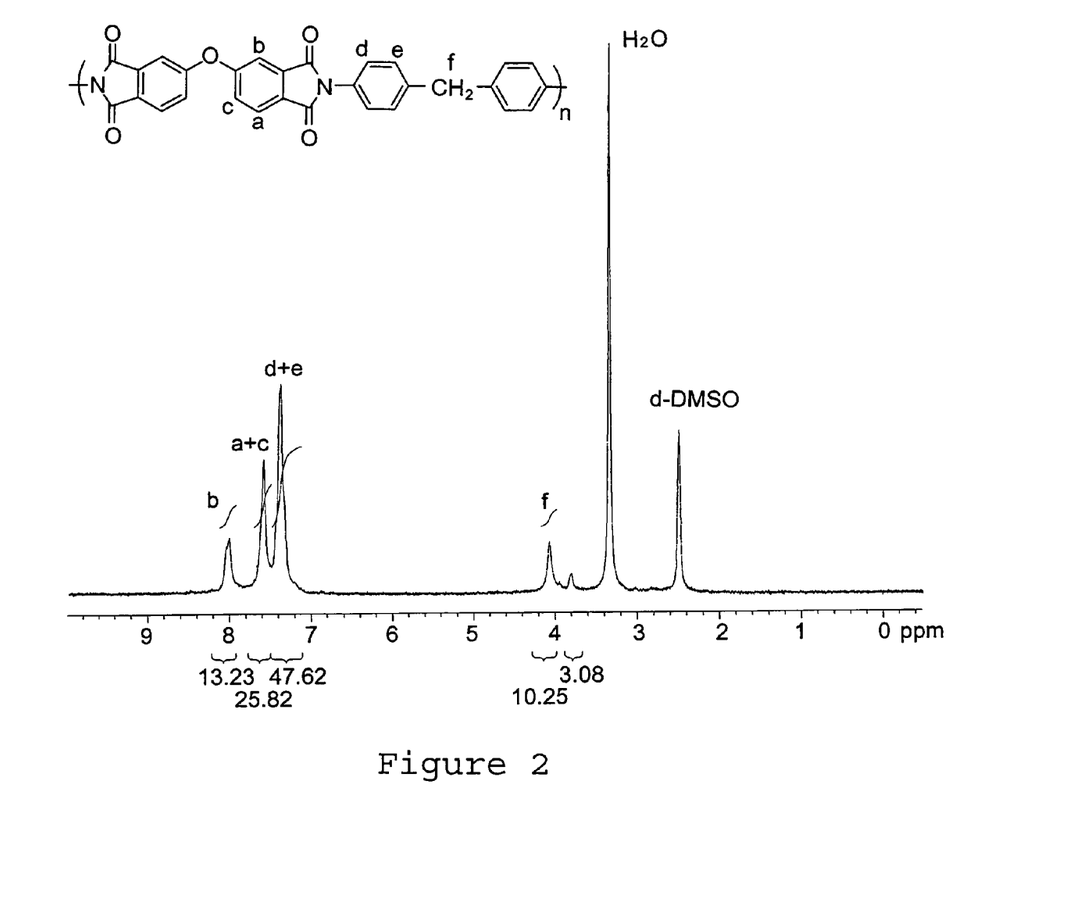

NMP (20 ml) was placed into a 100 ml, three-necked, round-bottomed flask equipped with a thermometer, a nitrogen gas inlet tube, a reflux condenser, an oil bath, and a magnetic stirrer. DMPO (20 mg) and ODPE (11.0 g, 2.67 mmol) were added and the mixture was heated to 180° C. with stirring for 10 minutes. MDI (0.67 g; 2.67 mmol) was added into the mixture. The mixture was heated to 200° C. and stirred for 5 h. The resulting solution obtained was poured into 500 ml of water. The resulting product was filtered and dried, to yield 1.153 g (91%) of MDI-ether-PT. The $^1$H NMR analysis of MDI-ether-PI was shown in FIG. 2. The detailed reactions scheme is as shown in Scheme 3.

Example 8

Figure 3:
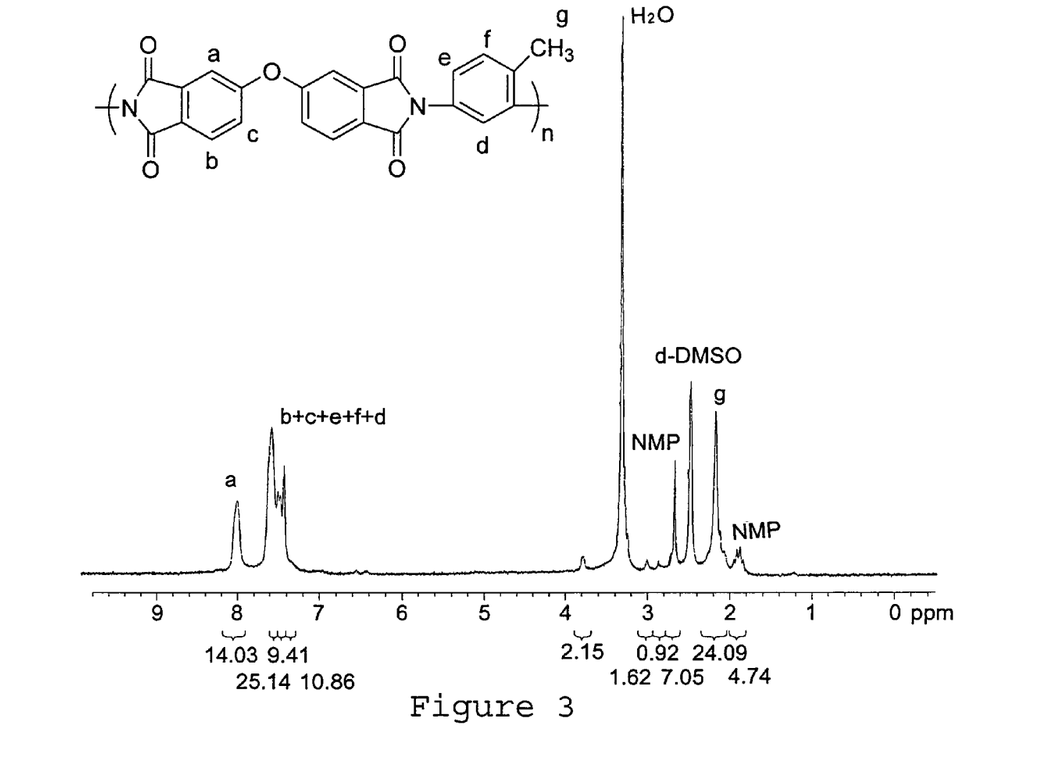

NMP (20 ml) was placed into a 100 ml, three-necked, round-bottomed flask equipped with a thermometer, a nitrogen gas inlet tube, a reflux condenser, an oil bath, and a magnetic stirrer. DMPO (20 mg) and ODPE (1.0 g, 2.67 mmol) were added and the mixture was heated to 180° C. with stirring for 10 minutes. TDI (0.465 g; 2.67 mmol) was added into the mixture, and the mixture was heated to 200° C. and stirred for 5 h. The resulting solution obtained was poured into 500 ml of water. The resulting product was filtered and dried, to yield 1.06 g (99.9%) TDI-ether-PI. The $^1$H NMR analysis of TDI-ether-PI was shown in FIG. 3. The detailed reactions scheme is as shown i Scheme 3.

Scheme 3 diester acids
BTDE
or ODPE

MDI-ketone-PI
TDI-ketone-PI
MDI-ether-PI
TDI-ether-PI

MDI or  TDI

It will be readily apparent that various modifications of the invention are possible and will readily suggest themselves to those skilled in the art and are contemplated.

What is claimed is:

1. A process for synthesizing a polyimide having the formula comprising:

a) reacting a dianhydride having the formula with $R_2$—OH in a molar ratio of about 1:1 to form an acid-ester functionalized anhydride having the formula b) reacting a poly (aryl carbodiimide) (p-CDI) and said acid-ester functionalized anhydride to form a poly-acylurea-functionalized ester-anhydride (p-AEA) having the formula p-AEA c) reacting said p-AEA with $R_2$—OH in a molar ratio of about 1:1 to form a poly-acylurea-functionalized ester-acid-ester (p-AEAE) having the formula p-AEAE d) heating said p-AEAE in the presence of a CDI catalyst to a temperature from about 120° C. to about 280° C. to form an aryl isocyanate and a poly(acid-ester-amide) having the following formula and simultaneously conducting a sequential self-repetitive reaction to form said polyimide, wherein said sequential self-repetitive reaction involves repetitions of three sequential steps comprising:

1) catalytically converting said aryl isocyanate into said p-CDI in the presence of said CDI catalyst;

2) reacting said p-CDI and said poly(acid-ester-amide) to form a poly-acylurea-functionalized amide-ester (p-AAE) having the formula p-AAE 3) thermolyzing said p-AAE obtained in step 2) into said aryl isocyanate and a poly-di(ester-amide) having the formula poly-di(ester-amide)

said poly-di(ester-amide) further being subject to a ring-closure reaction to release $R_2OHs$ and form said polyimide as a product wherein, in the formulas above:

n is an integer in the range of 1 to 100;

R is a tetravalent aromatic organic radical containing at least one benzene ring or a tetravalent aliphatic organic radical containing at least two carbon atoms; and, $R_2$ is $C_{1-8}$ alkyl.

2. The process according to claim 1, wherein said aromatic dianhydride is selected from the group consisting of 3,3',4,4'-benzophenone tetracarboxylic acid dianhydride, pyromellitic dianhydride, 2,3,6,7-napthalene tetracarboxylic acid dianhydride, 3,3',4,4'-diphenyl tetracarboxylic acid dianhydride, 1,2,5,6-napthalene tetracarboxylic acid dianhydride, 2,2',3,3' diphenyl tetracarboxylic acid dianhydride, 2,2-bis(3,4,-dicarboxyphenyl) propane dianhydride, 3,4,9,10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl -1,2,3,5,6,7-hexahydronaphthalene-1,2,5,6-tetracarboxylic acid dianhydride, 2,6-dichloronaphthalene -1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene -1,8,9,10-tetracarboxylic acid dianhydride, bis(3,4-dicarboxyphenyl) sulfone dianhydride, (3',4'-dicarboxyphenyl) 2-dicarboxy 5,6-benzimidazole dianhydride, (3',4'-dicarboxyphenyl) 2-dicarboxy 5,6-benzoxazole dianhydride, (3',4'-dicarboxyphenyl) 2-dicarboxy 5,6-benzothiazole dianhydride, and his (3',4'-dicarboxydiphenylether) 2,5-oxadiazole 1,3,4 dianhydride.

3. The process according to claim 1, wherein said aliphatic dianhydride is selected from the group consisting of tetrahydrofuran tetracarboxylic dianhydride, cyclopentane tetracarboxylic dianhydride, bicycle[2,2,2]-octen-(7)-2,3,5,6-tetracarboxylic-2,3,5,6-dianhydride, 1,2,3,4-cyclobutanetetracarboxylic acid dianhydride, and 1,2,4,5-cyclobutanetetracarboxylic acid dianhydride.

4. The process according to claim 1, wherein step (b) comprises mixing said acid-ester functionalized anhydride with an aryl diisocyanate, following by catalytically converting said aryl diisocyanate into said p-CDI in the presence of a CDI catalyst.

5. The process according to claim 4 wherein said aryl diisocyanate is selected from the group consisting of 4,4'-diphenylmethane diisocyanate (MDI), 4,4'-biphenylene diisocyanate, 4,4'-Diisocyanatodiphenyl sulfide, 4,4'-diisocyanato diphenyl sulfone, 4,4'-diisocyanato diphenyl ether, meta-naphthalene diisocyanate (MNDI), para-naphthalene diisocyanate (PNDI), meta-phenylene diisocyanate (MPDI), para-phenylene diisocyanate (PPDI), tolylene diisocyanate (TDI), 4,4'-diisocyanato-3,3'-dimethyldiphenylenemethane, 4,4'-methylenebis(1-isocyanato-2-methoxybenzene), meta-xylylene diisocyanate, para-xylylene diisocyanate, and a mixture thereof.

6. The process according to claim 4 being a one-pot process.

7. The process according to claim 1, wherein said temperature in step d) is from about 120° C. to about 270° C.

8. The process according to claim 7, wherein said temperature in step d) is from about 140° C. to about 250° C.

9. The process according to claim 1 being a one-pot process.

10. A process for synthesizing a polyimide having the structural formula comprising:

a) reacting a dianhydride having the formula with $R_2$—OH in a molar ratio of about 1:2 to form a di(ester-acid) having the formula and b) heating said di(ester-acid) and a p-CDI (poly (aryl carbodiimide)) to a temperature from about 120° C. to about 280° C. to form an aryl isocyanate and a poly(acid-ester-amide) and simultaneously to conduct a sequential self-repetitive reaction, wherein said sequential self-repetitive reaction involves repetitions of three sequential steps comprising:

1) catalytically converting said aryl isocyanate into said p-CDI in the presence of a CDI catalyst;

2) reacting said p-CDI and said poly(acid-ester-amide) to form a poly-acylurea-functionalized amide-ester (p-AAE) having the formula p-AAE 3) thermolyzing said p-AAE obtained in step 2) into said aryl isocyanate and a poly-di (ester-amide) having the formula poly-di(ester-amide)

said poly-di(ester-amide) further being subject to a ring-closure reaction to release $R_2OH$s and form said polyimide as a product wherein, in the formulas above:

n is an integer in the range of 1 to 100;

R is a tetravalent aromatic organic radical containing at least one benzene ring or a tetravalent aliphatic organic radical containing at least two carbon atoms; and, $R_2$ is $C_{1-8}$ alkyl.

11. The process according to claim 10, wherein said aromatic dianhydride is selected from the group consisting of 3,3',4,4'-benzophenone tetracarboxylic acid dianhydride, pyromellitic dianhydride, 2,3,6,7-napthalene tetracarboxylic acid dianhydride, 3,3',4,4'-diphenyl tetracarboxylic acid dianhydride, 1,2,5,6-napthalene tetracarboxylic acid dianhydride, 2,2',3,3' diphenyl tetracarboxylic acid dianhydride, 2,2-bis(3,4,-dicarboxyphenyl) propane dianhydride, 3,4,9, 10-perylene tetracarboxylic acid dianhydride, bis(3,4-dicarboxyphenyl) ether dianhydride, naphthalene-1,2,4,5-tetracarboxylic acid dianhydride, naphthalene-1,4,5,8-tetracarboxylic acid dianhydride, decahydronaphthalene-1,4, 5,8-tetracarboxylic acid dianhydride, 4,8-dimethyl-1,2,3,5, 6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,8, 9,10-tetracarboxylic acid dianhydride, bis(3,4-dicarboxyphenyl) sulfone dianhydride, (3',4'-dicarboxyphenyl) 2-dicarboxy 5,6-benzimidazole dianhydride, (3',4'-dicarboxyphenyl) 2-dicarboxy 5,6-benzoxazole dianhydride, (3',4'-dicarboxyphenyl) 2-dicarboxy 5,6-benzothiazole dianhydride, and bis (3',4'-dicarboxydiphenylether) 2,5-oxadiazole 1,3,4 dianhydride.

12. The process according to claim 10, wherein said aliphatic dianhydride is selected from the group consisting of tetrahydrofuran tetracarboxylic dianhydride, cyclopentane tetracarboxylic dianhydride, bicycle-[2,2,2]-octen-(7)-2,3,5, 6-tetracarboxylic-2,3,5,6-dianhydride, 1,2,3,4-cyclobutanetetracarboxylic acid dianhydride, and 1,2,4,5-cyclobutanetetracarboxylic acid dianhydride.

13. The process according to claim 10, wherein step (b) comprises mixing said di(ester-acid) with an aryl diisocyanate, following by catalytically converting said aryl diisocyanate into a p-CDI in the presence of a CDI catalyst; and then heating said di(ester-acid) and said p-CDI.

14. The process according to claim 13, said aryl diisocyanate is selected from the group consisting of 4,4'-diphenylmethane diisocyanate, 4,4'-biphenylene diisocyanate, 4,4'-Diisocyanatodiphenyl sulfide, 4,4'-diisocyanato diphenyl sulfone, 4,4'-diisocyanato diphenyl ether, meta-naphthalene diisocyanate, para-naphthalene diisocyanate, meta-phenylene diisocyanate (MPDI), para-phenylene diisocyanate, tolylene diisocyanate, 4,4'-diisocyanato-3,3'-dimethyldiphenylenemethane, 4,4'-methylenebis(1-isocyanato-2-methoxybenzene), meta-xylylene diisocyanate, para-xylylene diisocyanate, and a mixture thereof.

15. The process according to claim 13 being a one-pot process.

16. The process according to claim 10, wherein said temperature in step b) is from about 120° C. to about 270° C.

17. The process according to claim 16, wherein said temperature in step b) is from about 140° C. to about 250° C.

18. The process according to claim 10 being a one-pot process.

* * * * *

UNITED STATES PATENT AND TRADEMARK OFFICE
CERTIFICATE OF CORRECTION

| | | |
|---|---|---|
| PATENT NO. | : 7,935,779 B2 | Page 1 of 1 |
| APPLICATION NO. | : 12/044309 | |
| DATED | : May 3, 2011 | |
| INVENTOR(S) | : Shenghong A. Dai et al. | |

It is certified that error appears in the above-identified patent and that said Letters Patent is hereby corrected as shown below:

In Claim 2, Column 17, line 44, the word "his" at the end of line 44 should be "bis."

Signed and Sealed this
Second Day of August, 2011

David J. Kappos
*Director of the United States Patent and Trademark Office*